US009477824B2

(12) United States Patent
Lin

(10) Patent No.: US 9,477,824 B2
(45) Date of Patent: Oct. 25, 2016

(54) CLOUD CONTROL SYSTEM AND METHOD FOR LAN-BASED CONTROLLED APPARATUS

(71) Applicant: WE RDONLINE CO., LTD., Kaohsiung (TW)

(72) Inventor: Kung-Cheng Lin, Kaohsiung (TW)

(73) Assignee: WE RDONLINE CO., LTD., Kaohsiung (TW)

( * ) Notice: Subject to any disclaimer, the term of this patent is extended or adjusted under 35 U.S.C. 154(b) by 163 days.

(21) Appl. No.: 14/224,075

(22) Filed: Mar. 25, 2014

(65) Prior Publication Data

US 2014/0298436 A1   Oct. 2, 2014

(30) Foreign Application Priority Data

Mar. 27, 2013   (TW) .............................. 102110862 A

(51) Int. Cl.
| | |
|---|---|
| H04L 29/06 | (2006.01) |
| G06F 21/31 | (2013.01) |
| H04L 12/709 | (2013.01) |
| H04L 9/08 | (2006.01) |
| H04L 29/08 | (2006.01) |

(52) U.S. Cl.
CPC ............ *G06F 21/31* (2013.01); *H04L 9/0863* (2013.01); *H04L 45/245* (2013.01); *H04L 63/083* (2013.01); *H04L 67/1002* (2013.01)

(58) Field of Classification Search
None
See application file for complete search history.

(56) References Cited

U.S. PATENT DOCUMENTS

| | | | | |
|---|---|---|---|---|
| 8,189,225 B1* | 5/2012 | Lo | ............................ | G06F 3/122 358/1.15 |
| 8,745,713 B1* | 6/2014 | Connor | ................... | H04L 63/14 713/187 |
| 2007/0192593 A1* | 8/2007 | Boisjolie | ........... | H04L 29/12367 713/162 |
| 2007/0204350 A1* | 8/2007 | Juszkiewicz | ............ | G06F 21/10 726/30 |
| 2011/0277029 A1* | 11/2011 | Natarajan | ........... | H04L 12/2461 726/15 |
| 2012/0297075 A1* | 11/2012 | Rojvongpaisal | ...... | H04L 67/141 709/227 |
| 2013/0063265 A1* | 3/2013 | Feldstein | ............ | H04L 12/2825 340/541 |
| 2013/0067550 A1* | 3/2013 | Chen | ....................... | H04L 67/10 726/7 |
| 2013/0152175 A1* | 6/2013 | Hromoko | .......... | H04W 36/0011 726/5 |
| 2013/0227673 A1* | 8/2013 | Yoon | .................... | G06F 21/6209 726/15 |
| 2013/0243004 A1* | 9/2013 | Hikichi | ................... | H04L 12/66 370/401 |
| 2014/0181916 A1* | 6/2014 | Koo | ....................... | H04W 12/08 726/4 |
| 2015/0055779 A1* | 2/2015 | Enomoto | ............... | G08C 17/00 380/270 |

* cited by examiner

*Primary Examiner* — Farid Homayounmehr
*Assistant Examiner* — Olanrewaju Bucknor
(74) *Attorney, Agent, or Firm* — Leong C. Lei

(57) ABSTRACT

A cloud control system for LAN-based controlled apparatus and method for the same is disclosed. The cloud control system includes a cloud server and a LAN sub-system. The LAN sub-system includes a LAN communication apparatus, a LAN server host, a controlled apparatus that is controlled by the LAN server host, and a an electronic device that may connect to the cloud server and the LAN server host. After logging in to the cloud server through the LAN communication apparatus of the LAN sub-system, the electronic device may acquire the a path linking to the controlled apparatus and may connect to and operate the controlled apparatus by selecting the apparatus linking path. Through the design on the cloud server that controls the controlled apparatus of each of the LAN sub-systems for the permission of linking and operation, the procedure of installation and configuration of the controlled apparatus may be simplified and the time of search for the controlled apparatus may be shorten, and further the security of the controlled apparatuses and their data transmission may be increased.

2 Claims, 3 Drawing Sheets

CLOUD CONTROL SYSTEM AND METHOD FOR LAN-BASED CONTROLLED APPARATUS

(A) TECHNICAL FIELD OF THE INVENTION

This invention relates to an apparatus control system and method and particularly to a cloud control system and method for controlled apparatus in a local area network.

(B) DESCRIPTION OF THE PRIOR ART

Before a Point of Sale (POS) system is connected in a conventional manner to an invoice printer and card reader as controlled apparatus, the driver installation and user software settings of the controlled apparatus must be done for a transaction carrier in the POS system and the controlled apparatus must be set for control. If the controlled apparatuses are connected to only one transaction carrier of the POS system, the installation and setting tasks described above are easier. However, when the controlled apparatuses are used to work with multiple transaction carriers, the driver installation and control setting of each of the transaction carriers must be done and the controlled apparatuses must be set respectively for control of the transaction carriers. If there is something wrong with the controlled apparatus and then a new controlled apparatus must be installed, the driver installation and setting of all of the transaction carriers must be done again and the new controlled apparatus must be set for control, which is inconvenient to users and increases the cost of maintenance of the POS system.

In order to solve the technical issue described above, some system developers connect the POS system to a cloud server that controls the controlled apparatuses. As long as all of the transaction carrier connect to the cloud server, the controlled apparatus may controlled by the cloud server. Although complicated steps of installing the driver on the transaction carriers and doing settings of the carrier one by one in the manner may be avoided, there are still disadvantages, as shown below.

(1) The controlled apparatus being directly controlled by the cloud server, it is likewise considered that the controlled apparatus is open on the Internet. Although it may be protected from invasion and attack by means of a security encryption mechanism, as long as the account ID and password is stolen, the controlled apparatus may likewise be remotely controlled and used on the Internet, there being a risk of security.

(2) A higher risk of data leakage might be caused by transfer of data to the cloud sewer on the Internet because the data is transferred through the controlled apparatuses to the cloud server and then output back to the controlled apparatuses.

(3) The data in the transaction carriers is transferred through the cloud server to the controlled apparatuses, so the network traffic load significantly increases and, if one of the network nodes is abnormal, the data output might be interrupted or abnormal, causing poor stability.

Consequently, because of the technical defects described above, to provide the cloud control system and method for Local Area Network (LAN) based controlled apparatus, the applicant, based on many years of research and experience in the relevant industry has developed the present invention, which may effectively improve the defects described above.

SUMMARY OF THE INVENTION

Accordingly, this invention is to provide a cloud control system for LAN-based controlled apparatus that is easily operated and controlled in a LAN sub-system.

Accordingly, this invention is to provide a cloud control method for operating and controlling a LAN-based controlled apparatus in a local area network.

Thus, the cloud control system for LAN-based controlled apparatus according to this invention comprises a cloud server and at least one LAN sub-system connected to the cloud server over the Internet. The LAN sub-system comprises a LAN communication apparatus that may be connected to the cloud server over the Internet; a LAN server host that may communicate with the cloud server by using the LAN communication apparatus; at least one controlled apparatus signaling to the LAN server host and being controlled by the LAN server host; and at least one electronic device that may connect and log in to the cloud server by using the LAN communication apparatus and may log in and link to the LAN server host, in which the LAN server host registers to the cloud server for registration, with a LAN Internet Protocol address (IP) and a piece of information of the controlled apparatus. Then, the cloud server pairs and links together the LAN IP and apparatus information that are used by the LAN server host for registration and generates an apparatus linking path and , after the electronic device successfully connects and logs in, sends the apparatus linking path to the electronic device.

Thus, the method of cloud control of LAN-based controlled apparatus according to this invention comprises the following steps: (A) allowing a LAN server host of a LAN sub-system to connect to the Internet through a LAN communication apparatus of the LAN sub-system and then connect to a cloud server, and allowing it registers to the cloud server for registration, with its LAN IP and a piece of information of all of the installed and linked controlled apparatuses; (B) respectively establishing linking paths of the controlled apparatuses to the cloud server with the apparatus information and LAN IP registered by the LAN server host; (c) allowing an electronic device to get a linking path of at least one apparatus to the LAN sub-system through the LAN communication apparatus logging in to the cloud server; and (D) allowing the electronic device to connect to the LAN server host, when the linking path of apparatus is selected, and to link to and use the controlled apparatus corresponding to the linking path of apparatus.

In this invention, through the design on the cloud server that controls the controlled apparatus of each of the LAN sub-system for the permission of linking and operation, the procedure of installation and configuration of the controlled apparatus may be simplified and the time of search for the controlled apparatus may be shorten, and further the security of the controlled apparatuses and their data transmission may be increased.

In order to further know the features and technical means of this invention, refer to the detailed description below according to this invention accompanied with drawings; however, the accompanied drawings are provided for reference and illustration only and are not limited to this invention.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
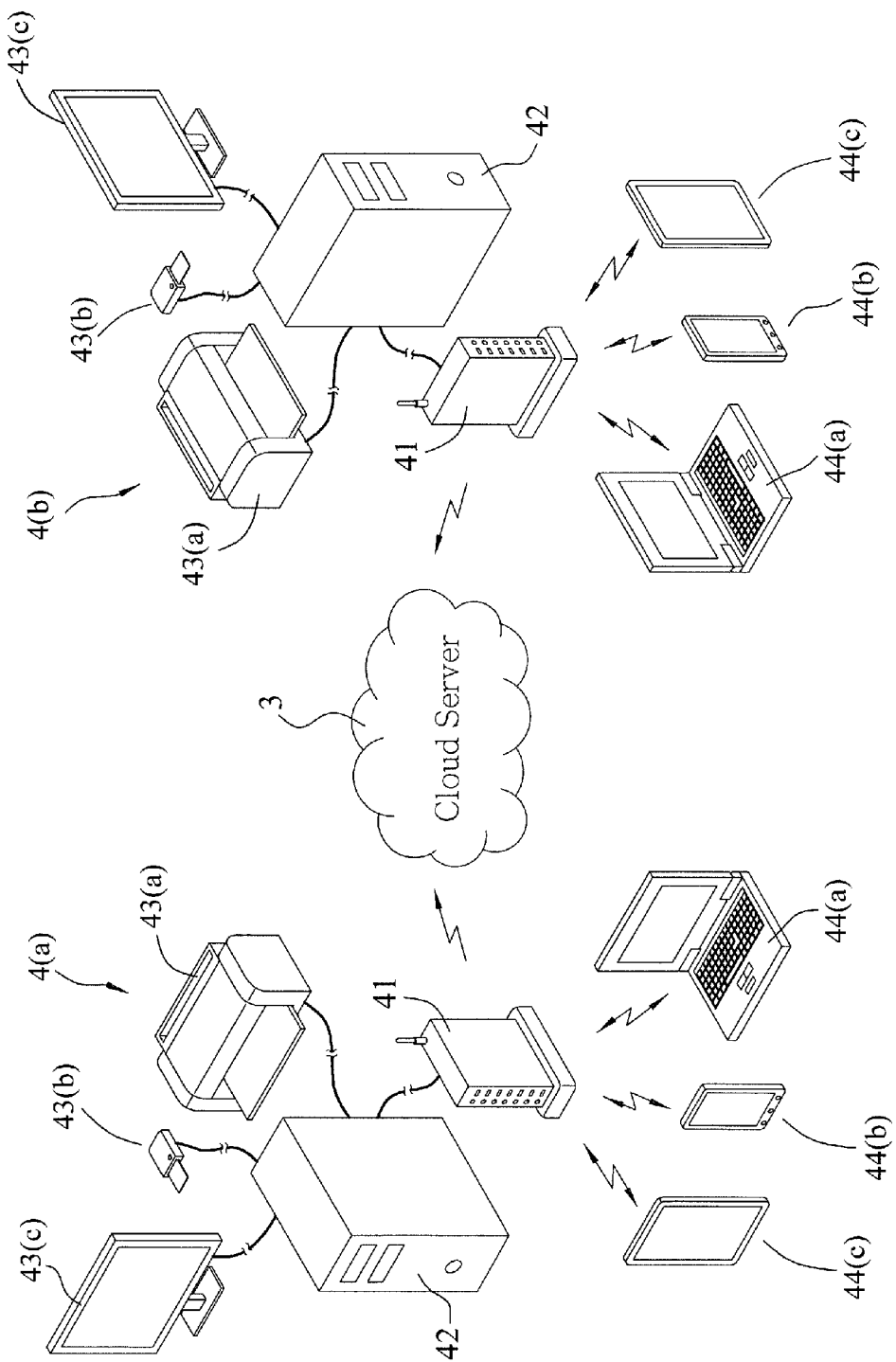
FIG. 1 is a schematic view illustrating a preferred embodiment of a cloud control system for LAN-based controlled apparatus according to this invention.
Figure 2:
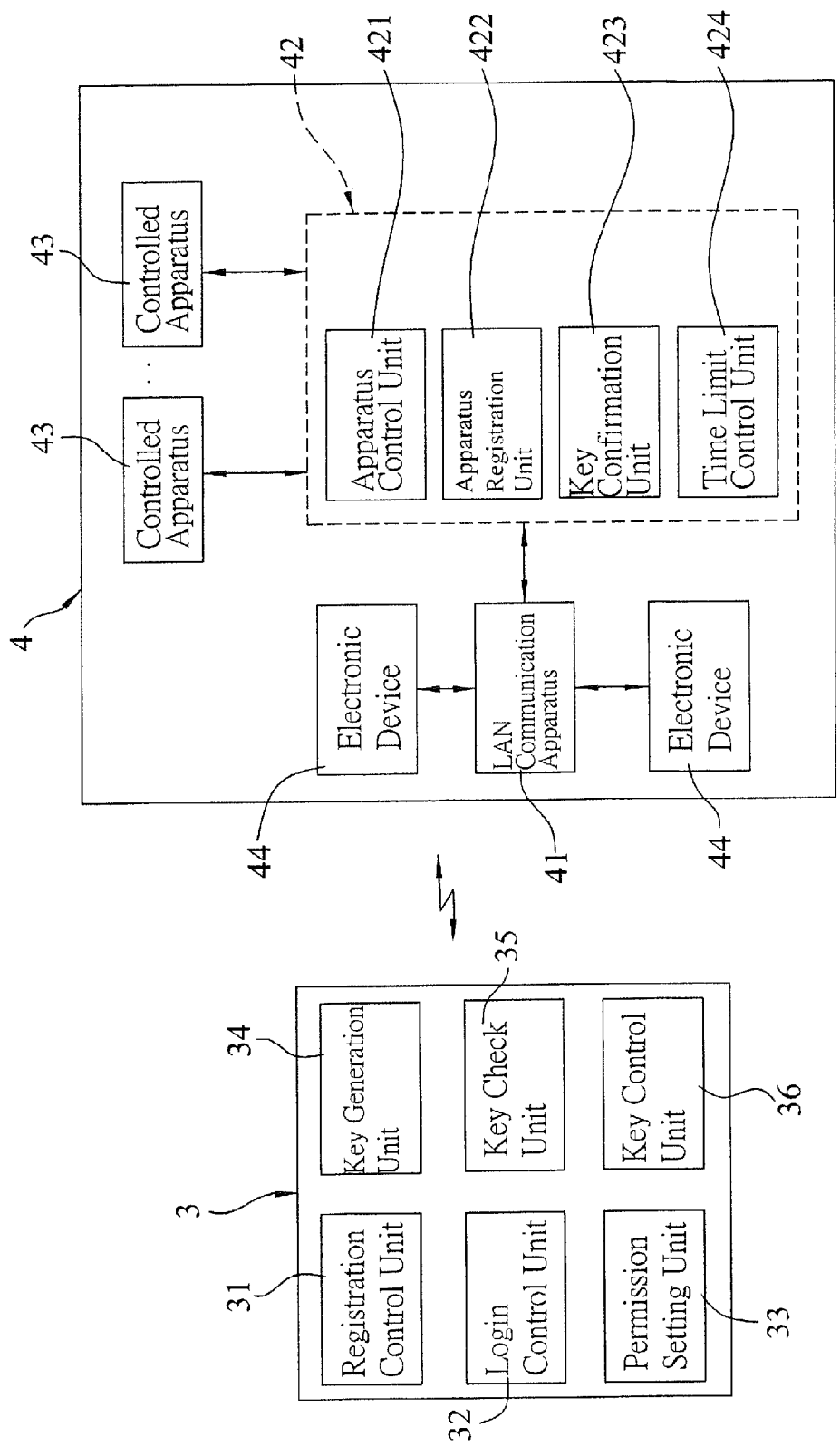
FIG. 2 is a functional block diagram of a cloud server and a LAN sub-system in the preferred embodiment.

With reference to FIGS. 1 and 2 illustrating a preferred embodiment, a cloud control system for LAN-based controlled apparatus according to this invention is applied to a controlled apparatus 43 that is controlled in different LANs for operation permission. The cloud control system for LAN-based controlled apparatus comprises a cloud server 3 and a plurality of LAN sub-systems 4 respectively connected through the Internet to the cloud server 3.

Each of the LAN sub-systems 4 comprises a LAN communication apparatus 41 connected to the Internet, a LAN server host 42 signaling to the LAN communication apparatus 41, a plurality of controlled apparatuses 43 electrically connected to the LAN server host 42 and controlled by the LAN server host 42, and a plurality of electronic devices 44 signaling to the LAN communication apparatus 41. In each of the LAN sub-systems 4, the LAN server host 42 and the electronic devices 44 are assigned respectively with different LAN IPs. The LAN communication apparatus 41 is a familiar network server that is designed in various ways and is not the key point in this invention, so it is not described in detail for the networking function.

The controlled apparatuses 43 may be a photocopier, scanner, printer, card reader, display, database apparatus, access control apparatus, punch-card machine or the like used in a store or an office and may also be a TV set, lamp, air conditioner, audio system, oven, video player, microwave oven, or another household electrical appliance used in a house. The electronic devices 44 may be a mobile phone, tablet computer, desktop PC or laptop PC, or POS transaction apparatus that is connected to the LAN communication apparatus 41 and thereby connected to the Internet. Further, the electronic devices 44 may signal to the LAN communication apparatus 41 with a transmission cable (not shown) or to the apparatus 41 in a wireless communication technology. In the embodiment of this invention, the controlled apparatuses 43 and the electronic devices 44 are not limited to those described above.

The LAN server host 42 comprises an apparatus control unit 421, an apparatus registration unit 422, a key confirmation unit 423, and a time limit control unit 424. The apparatus control unit 421 is built with a driver controlling all controlled apparatuses 43 and thus may control each of the controlled apparatuses 43 and may correspondingly output a piece of information on each of the controlled apparatuses 43. The apparatus information comprises a name and a model number of each of the controlled apparatuses 43 but is not limited to what is described above in this embodiment.

The apparatus registration unit 422 may be connected to the cloud server 3 through the LAN communication apparatus 41 connecting to the Internet and sends the LAN IP of LAN server host 42 and the information on the apparatuses to the cloud server 3 for apparatus registration.

The key confirmation unit 423 may be connected to the cloud server 3 through the LAN communication apparatus 41 before the electronic devices 44 signals for connecting to the controlled apparatuses 43, and determines whether a key given by each of the electronic devices 44 is valid, and may receive a confirmation signal or an invalid signal replied by the cloud server 3. Further, when receiving the confirmation signal indicating that the key is valid, the unit 423 allows the electronic device 44 giving the valid key to connect to and use the controlled apparatus 43, or allows the data outputted from the electronic device 44 through the controlled apparatuses 43, and sends the received data, after being processed, to a corresponding controlled apparatus 43. When receiving the invalid signal, it rejects the electronic device 44 using the invalid key from connecting to and using the controlled apparatuses 43.

The time limit control unit 424 may starts to limit the remaining time of operation of all electronic devices 44 connected to the controlled apparatus 43 after the LAN communication apparatus 41 and the cloud server 3 disconnect from the Internet, and disconnects the signal connection of all of the electronic devices 44 from that of controlled apparatuses 43 after the limit time counting ends and, that is, rejects the electronic devices 44 from having the permission to use the controlled apparatus 43.

The electronic devices 44 may connect and log in to the cloud server through the LAN communication apparatus 41 of LAN sub-system that connects to the Internet, and may receive a key sent by the cloud server 3, and one or more apparatus linking paths respectively connecting to the key, and may directly signal to the LAN server host 42 by means of selection of the apparatus linking paths and send the key to the key confirmation unit 423 of LAN server host 42 at the same time, and after the key is confirmed by the key confirmation unit 423, the controlled apparatus 43 corresponding to the selected apparatus linking path may be connected for operation.

The cloud server 3 comprises a registration control unit 31, a login control unit 32, an access permission setting unit 33, a key generation unit 34, a key check unit 35, and a key control unit 36.

The registration control unit 31 the LAN IP and apparatus information that are sent by the LAN server host 42 of each of the LAN sub-systems 4, pairs the LAN IP separately with the pieces of apparatus information for registration, records and stores the registration data on the controlled apparatuses 43 of each of the LAN sub-systems 4, and generates an apparatus linking path depending on each apparatus information. The apparatus linking path contains the content regarding the LAN IP of LAN server host 42, and apparatus information. However, in the embodiment, the content of apparatus path is not limited herein.

The login control unit 32 is provided with multiple groups of account IDs/passwords respectively corresponding to the LAN sub-systems 4, and may check whether the account ID/password inputted from the electronic device 44 are corresponding to one of the preset account IDs and passwords when the electronic device 44 logs in and connects over the Internet. If the account ID/password are correct and correspond, the electronic device 44 is allowed to log in and connect and a login signal is given.

The permission setting unit 33 is provided for configuring the permission of controlled apparatuses 43 that may be used with each account ID/password; that is, it is provided for configuring the permission of controlled apparatuses 43, which are used with each of the account IDs/passwords, respectively depending upon the pieces of information of the controlled apparatuses 43 registered to the registration control unit 31.

The key generation unit 34 is driven by the login signal to generate a key. The key may be a string of numbers, alphabets, symbols or numbers, or the combination of alphabets and/or symbols, and is not limited herein. The key generation unit 34 captures the linking path where all of the controlled apparatuses 43 that may be used under the rule of permission are located by following the login control unit 32 that checks the apparatus permission of the approved account ID/password, pairs the key with each of the linking paths of apparatuses, and sends it to the electronic device 44 using the account ID/password.

The key check unit 35 receives a key sent by the key confirmation unit 423 of the LAN server host 42 of each of the LAN sub-systems 4, compares all keys generated by the key generation unit 34, and when a key generated by the key generation unit 34 corresponds, sends a confirmation signal indicating a valid key to the key confirmation unit 423, and when the key does not correspond, sends an invalid signal indicating the key is invalid to the key confirmation unit 423.

When the LAN communication apparatus 41 of a LAN sub-system 4 disconnects from the Internet, the key control unit 36 may set all keys generated by the key generation unit 34 for the LAN sub-system 4 disconnecting from the Internet to an invalid key, and when the LAN sub-system 4 resumes to connect to the internet again and the LAN server host 42 confirms a key given by the electronic device 44 before disconnecting from the Internet, determines that the key is invalid and send the invalid signal to the LAN server host 42.

Figure 3:
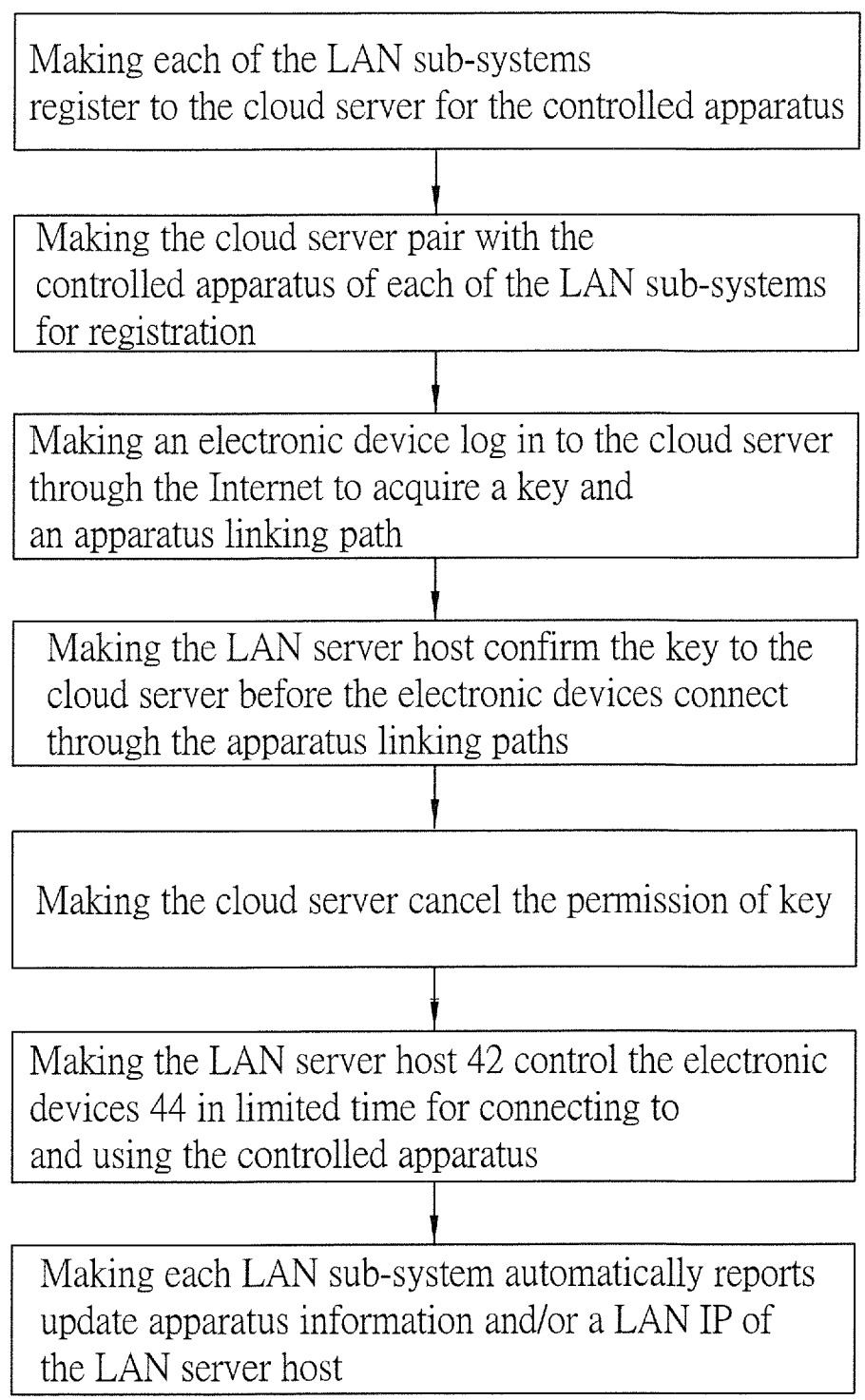
FIG. 3 is a flow chart of implementation of steps of the preferred embodiment in a method of cloud control of LAN-based controlled apparatus according to this invention.

With reference to FIG. 3, the method of cloud control of LAN-based controlled apparatus according to this invention may be implemented through a suite of utility software and the cloud server 3 and LAN sub-system 4 that work with each other. The method of cloud control of LAN-based controlled apparatus comprises the following steps.

At step (1), each of the LAN sub-systems 4 is allowed to register to the cloud server 3 for the controlled apparatus 43. The apparatus registration unit 422 of the LAN server host 42 of each of the LAN sub-systems 4 is made to generate a piece of apparatus information for each of its controlled apparatuses 43 that are installed and connected, and automatically connect to the cloud server 3 through the Internet to send its LAN IP and the apparatus information to the cloud server 3 for registration.

At step (2), the cloud server 3 is allowed to pair with the controlled apparatus 43 of each of the LAN sub-systems 4 for registration. The registration control unit 31 of cloud server 3 is made to pair the LAN IP with pieces of apparatus information for connection and registration when receiving the LAN IP and pieces of apparatus that are sent by the LAN server host 42 of each of the LAN sub-systems 4, and to generate an apparatus linking path according to each apparatus information.

At step (3), an electronic device 44 is allowed to log in to the cloud server 3 through the Internet to acquire a key and an apparatus linking path. When an electronic device 44 of a random LAN sub-system 4 is required to work with the controlled apparatus 43 in its LAN sub-system 4, the electronic device 44 must firstly connect and log in to the cloud server 3 through the LAN communication apparatus 41 of the LAN sub-system 4. When the electronic device 44 connects to the cloud server 3 through the Internet, the login control unit 32 of the cloud server 3 requests an account ID/password to the electronic device 44, and when checking whether or not the account ID/password inputted by the electronic device 44 is correct, allows the electronic device 44 log in and connect and output a registration signal. The key generation unit 34 correspondingly generates a key and also get all of the apparatus linking paths corresponding to the account ID/password from the registration control unit 31 depending on the permission setting unit 33 for the apparatus permission set for the account ID/password and, after pairing the apparatus linking paths with the key, sends them to the electronic device 44. What is described above means that not all of the electronic devices 44 may use all of the controlled apparatuses connecting to the LAN server host 42; namely, some of the electronic devices 44 may use all of the controlled apparatuses 43 and some of the electronic devices 44 may use only some of the controlled apparatuses 43.

At step (4), the LAN server host 42 is made to confirm the key to the cloud server 3 before the electronic devices 44 connect through the apparatus linking paths. When the electronic device 44 receives the key and the apparatus linking paths, users may directly connect to the LAN server host 42 by selecting one of the apparatus linking paths. Here, the key confirmation unit 423 of the LAN server host 42 also gets the key from the electronic device 44 and connects to the cloud server 3 to check whether the key is valid. When the cloud server 3 determines that the key is valid and returns the confirmation signal, the LAN server host 42 allows the electronic device 44 to connect to and use the controlled apparatus 43 corresponding to the apparatus linking path. However, when the cloud server 3 returns an invalid signal, the LAN server host 42 rejects the electronic device 44 from connecting to and using the controlled apparatus 43.

The apparatus linking paths contains the LAN IP of LAN server host 42 of the LAN sub-system 4, and the apparatus information corresponding to the controlled apparatus 43, so when the electronic device 44 of another LAN sub-system 4 get the key to another LAN sub-system 4 and the apparatus linking paths in another way, even if the key is determined to be valid, the electronic device 44 of the LAN sub-system 4 cannot cross to another region to connect to and use the controlled apparatus 43 of the LAN sub-system 4 none the less.

At step (5), the cloud server 3 is made to cancel the permission of key. The key control unit 36 of cloud server 3 is made to set all of the keys generated by the key generation unit 34 for the LAN sub-system 4 to invalid keys when the LAN sub-system 4 disconnects from the Internet. After the LAN sub-system 4 resumes to connect to the cloud server 3, the key that is previously sent to the electronic devices 44 of the LAN sub-system 4 is made to be invalid and thus cannot be confirmed by the key check unit 35. If re-connecting to the LAN server host 42 to use the controlled apparatus 43, the electronic devices 44 of the LAN sub-system 4 must log in and connect again to the cloud server 3 to acquire a new key.

At step (6), the LAN server host 42 is made to control the electronic devices 44 in limited time for connecting to and using the controlled apparatus 43. When a LAN sub-system 4 and the cloud server 3 disconnect from the Internet, the time limit control unit 424 of the LAN server host 42 starts to control the time of connection and operation of the electronic devices 44 of the controlled apparatuses 43 in limited time, and at end of time count, disconnects from the electronic devices 44 so that the electronic devices 44 cannot keep using the controlled apparatuses 43; namely, the electronic devices 44 may use the controlled apparatuses 43 for a period of time only at the state of disconnection and then must re-connect and log in to the cloud server 3 for re-acquiring a key.

At step (7), each LAN sub-system 4 is made to automatically reports update apparatus information and/or a LAN IP of the LAN server host 42. The LAN server host 42 of each of the LAN sub-systems 4 is made to periodically report the latest apparatus information after the controlled apparatuses 43 are registered for the first time, or when the controlled apparatus 43 that are installed and configured is changed, for example a controlled apparatus 43 being added or the original controlled apparatus 43 being removed, or the LAN IP is changed, automatically send the cloud server 3 for a new registration the old LAN IP before changed or a new LAN IF after changed, and/or new apparatus information after changed. The registration control unit 31 of the cloud server 3 pairs and registers the apparatus again depending on the new and old LAN IPs and/or new apparatus information that are sent by the LAN server host 42, and adds, deletes, or updates the apparatus linking paths.

When step (7) is executed, steps (2) and (3) are otherwise executed. At step (2), the permission of controlled apparatus 43 after being added or updated is changed according to each account ID/password. At step (3), the key generation unit 34 of the cloud server 3 re-gets a corresponding apparatus linking path according to the permissions of connected apparatus of which the account IDs/passwords are charged, and after separately re-pairing the keys corresponding to the account IDs/passwords for connection, sends them to the electronic devices 44 using the account IDs/passwords, thereby controlling the permission of the electronic devices 44 connecting to and using the controlled apparatus 43. Further, whenever logging in and connecting to the cloud server 3, the electronic device 44 may acquire the latest information on the controlled apparatus, no inquiry being thereby required.

In the embodiment described above, before using the controlled apparatus 43 of the LAN sub-system 4, the electronic devices 44 must connect to the cloud server 3 through the LAN communication apparatus 41 of the LAN sub-system 4, and after logging in to the cloud server by using the account ID/password, may get the apparatus linking paths where the controlled apparatuses 43 that may be used is located, and connect to the LAN server host 42 to use the key required by the controlled apparatuses 43. However, in the embodiment, the account ID/password and the key are not necessary. In the embodiment, it may be designed that when the LAN sub-system 4 registers to the cloud server 3 according to the information on the controlled apparatus 43 that is connected and its LAN IP, the cloud server 3 may establish only the linking paths where the controlled apparatuses 43 of the LAN sub-systems 4 are located. When the electronic device 44 requests to use the controlled apparatuses 43 of the LAN sub-system 4, the electronic device 44 may connect and log in to the cloud server 3 through the LAN communication apparatus 41 of the LAN sub-system 4 without using the account ID/password, and may connect and log in to the LAN sub-system 4 respectively through the apparatus linking paths and connect to the controlled apparatuses 43 by directly selecting the apparatus linking paths where the controlled apparatuses 43 of the LAN sub-system 4 are located. Here, the data to be outputted or processed may be sent to the controlled apparatuses 43 of the LAN sub-system 4.

To sum up, by means of the control design, when the LAN server host 42 of the LAN sub-system 4 is provided with multiple controlled apparatuses 43, through the registration to the cloud server 3, the cloud server 3 is made to register and record the controlled apparatuses 43 provided in each of the LAN sub-systems 4. When the electronic device 44 of a LAN sub-system 4 requests to use a controlled apparatus 43, through the LAN communication apparatus 41 of LAN sub-system 4 that connects and logs in to the cloud server 3, it may acquire the key to login to the LAN server host 42 to connect to the controlled apparatus 43, and directly connect to the apparatus linking paths of the controlled apparatuses 43 without taking pains to search for which controlled apparatus 43 in its LAN sub-system 4 may be used, which is very easy.

What is described above means that, in each LAN sub-system 4, driver is installed and function is configured only in the LAN server host 42 for the controlled apparatuses 43, and it is not required that driver is installed and function is configured in each electronic device 44 for the controlled apparatus 43. Because the electronic devices 44 must use the controlled apparatus 43, after logging in and connecting to the cloud server 3, the devices 44 may detect which controlled apparatuses 43 in the LAN sub-system 4 are available, and the addresses of controlled apparatuses 43 to which may be connected for operation. Further, the controlled apparatuses 43 may be connected to and shared by multiple electronic devices 44 at the same time; thus, the procedure of installation and configuration of the controlled apparatuses 43 may be simplified and the time of search of the electronic devices 44 for controlled apparatuses 43 available may be saved, which is very easy and practical.

Further, through the cloud server 3 that is used to control the account ID/password by which the electronic device 44 connects and logs in, when the electronic device 44 connects to the controlled apparatus 43 following the apparatus linking path, the LAN server host 42 may control the controlled apparatuses 43 by connecting the cloud server 3 to determine the validity of key of the electronic device 44 and thus may effectively control the permission of connection of the electronic devices 44 of each LAN sub-system 4 to the controlled apparatuses 43. Although each of the LAN sub-systems 4 uploads the information on the installed controlled apparatuses 43 to the cloud server 3 for registration and collection, the controlled apparatuses 43 do not stay open. Thus, only the electronic device 44 using the same LAN communication apparatus 41 to connect and log in to the cloud server 3 is permitted, which may prevent another electronic device 44 from illegally remote controlling and operating the controlled apparatuses 43 through the Internet for increasing the security of operation of the controlled apparatuses 43.

Further, the data outputted by the electronic device 44 through the controlled apparatus 43 is directly sent to the LAN server host 42 of the LAN sub-system 4 but not transferred by the cloud server 3 over the Internet, which may thereby prevent the data from being leaked, relatively increase the security of data transmission, and significantly lower the load of network traffic.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

I claim:

1. A method of cloud control of Local Area Network (LAN)-based controlled apparatus, comprising the following steps:
   - (A) making a LAN server host of a LAN sub-system to connect to the Internet through a LAN communication apparatus of the LAN sub-system and then connect to a cloud server, and making it register to the cloud server with its LAN Internet Protocol address (IP) and a piece of apparatus information of a plurality of controlled apparatuses that are electrically connected to and controlled by the LAN server host;
   - (B) respectively establishing apparatus linking paths of the controlled apparatuses t~ in the cloud server with the apparatus information and LAN IP registered by the LAN server host;
   - (C) making an electronic device signally connected to the LAN sub-system log into the cloud server through the LAN communication apparatus to get at least one apparatus linking path of a controlled apparatus; and
   - (D) making the electronic device to connect to the LAN server host, when selecting the apparatus linking path of the controlled apparatus, and to link to and use the controlled apparatus corresponding to the apparatus linking path;

wherein step (B) is a step at which multiple groups of accounts or passwords that respectively correspond to the LAN sub-system are established in the cloud server, and the linking path of controlled apparatus that is used with each of the account IDs or passwords is set according to the apparatus information and LAN IP that are registered by the LAN server host: step (C) is a step at which the electronic device is made to use one of the account IDs or passwords that are established in the cloud server to log in to the cloud server and get a key given by the cloud server, and at least one apparatus linking path corresponding to the account ID or password that are used; step (D) is a step at which secondary steps (D1) and (D2) are included, in which, at the secondary step (D1), the electronic device is made to send the key to the LAN server host when the device selects the apparatus linking path, and at the secondary step (D2) the LAN server host is made to connect to the cloud server to determine whether or not the key sent by the electronic device is valid and, when the cloud server determines that the key is valid, it allows the electronic device to connect to and use the controlled apparatus corresponding to the apparatus linking path; the method further comprises step (G) at which when the LAN IP is changed; the LAN server host sends the apparatus information and changed LAN IP to the cloud server to register again, in which at step (B) the linking path of controlled apparatus that is used with each account ID or password is further reset for the cloud server according to the changed LAN IP of LAN server host, and at step (C) when the apparatus linking path that is corresponding to the account ID or password that is being used for login is reset, the cloud server sends the reset apparatus linking path to the electronic device that is being used with the account ID or password.

2. The method of cloud control of LAN-based controlled apparatus according to claim 1, wherein the method further comprises step (F) at which after the LAN sub-system disconnects from the cloud server, the LAN server host is made to limit the time of operation of the electronic device to the electronic apparatus and, after the limit time ends, disconnect the signal connection of electronic device from the controlled apparatus.

* * * * *